(12) United States Patent
Gupta et al.

(10) Patent No.: US 12,076,666 B2
(45) Date of Patent: Sep. 3, 2024

(54) HEAD SPACE FOR DEPTH FILTERS AND METHODS OF USING THE SAME

(71) Applicant: EMD Millipore Corporation, Burlington, MA (US)

(72) Inventors: Akshat Gupta, Tewksbury, MA (US); John Paul Amara, Reading, MA (US); Kara M. Pizzelli, Hingham, MA (US); Shannon Ryan, Reading, MA (US)

(73) Assignee: EMD Millipore Corporation, Burlington, MA (US)

( * ) Notice: Subject to any disclaimer, the term of this patent is extended or adjusted under 35 U.S.C. 154(b) by 697 days.

(21) Appl. No.: 17/312,109

(22) PCT Filed: Mar. 26, 2020

(86) PCT No.: PCT/US2020/025059
§ 371 (c)(1),
(2) Date: Jun. 9, 2021

(87) PCT Pub. No.: WO2020/198527
PCT Pub. Date: Oct. 1, 2020

(65) Prior Publication Data
US 2021/0354055 A1  Nov. 18, 2021

Related U.S. Application Data

(60) Provisional application No. 62/825,505, filed on Mar. 28, 2019.

(51) Int. Cl.
*B01D 24/10* (2006.01)
*B01D 39/16* (2006.01)
(Continued)

(52) U.S. Cl.
CPC ......... *B01D 24/10* (2013.01); *B01D 39/1623* (2013.01); *B01D 39/18* (2013.01);
(Continued)

(58) Field of Classification Search
CPC .... B01D 24/10; B01D 39/1623; B01D 39/18; B01D 39/2068; B01D 2201/182;
(Continued)

(56) References Cited

U.S. PATENT DOCUMENTS 5,965,019 A * 10/1999 Olsen .................. B01D 29/41
210/453
8,580,560 B1  11/2013 Ellis et al.
(Continued)

FOREIGN PATENT DOCUMENTS

CN  102665641 A  9/2012
JP  2006-000848 A  1/2006
(Continued)

OTHER PUBLICATIONS

Office Action received for Korean Patent Application No. 10-2021-7030396 mailing date Dec. 6, 2023, 16 Pages (8 Pages of English translation and 8 Pages of official copy).
(Continued)

*Primary Examiner* — Patrick Orme
(74) *Attorney, Agent, or Firm* — EMD Millipore Corporation (57) ABSTRACT

Depth filters with optimized head space are provided, as well as methods of optimizing the head space in depth filters, and methods of filtration with depth filters having optimized head space, including clarification of flocculated feed streams where pretreatment may include any of lowering cell culture pH, addition of polymers (uncharged or charged), or addition of salts to precipitate out solubilized impurities resulting in high insoluble biomass.

20 Claims, 9 Drawing Sheets

(51) Int. Cl.
  *B01D 39/18* (2006.01)
  *B01D 39/20* (2006.01)
  *G01N 1/34* (2006.01)
  *G01N 1/40* (2006.01)

(52) U.S. Cl.
  CPC ........... *B01D 39/2068* (2013.01); *G01N 1/34* (2013.01); *G01N 1/4077* (2013.01); *B01D 2201/182* (2013.01); *G01N 2001/4088* (2013.01)

(58) Field of Classification Search
  CPC .. B01D 2239/065; G01N 1/34; G01N 1/4077; G01N 2001/4088
  See application file for complete search history.

(56) References Cited

U.S. PATENT DOCUMENTS

| | | | |
|---|---|---|---|
| 8,636,151 B2 | 1/2014 | Duval et al. | |
| 2005/0279695 A1* | 12/2005 | Straeffer | B01D 39/18 210/488 |

FOREIGN PATENT DOCUMENTS

| | | |
|---|---|---|
| JP | 2018-143898 A | 9/2018 |
| WO | 2011/084176 A1 | 7/2011 |
| WO | 2020/198527 A1 | 10/2020 |

OTHER PUBLICATIONS

Office Action received for Chinese Patent Application No. 202080009412.5 mailed on May 31, 2022, 14 Pages (7 Pages of English Translation & 7 Pages of Official Copy).

First Examination Report received for Indian Patent Application No. 202117030445 mailed on Mar. 16, 2022, 6 pages.

International Search Report and Written Opinion received for PCT Patent Application No. PCT/US2020/025059, mailed on Aug. 6, 2020, 10 pages.

Office Action received for Japanese Patent Application No. 2021-546291 mailing date Mar. 7, 2023, 7 Pages (4 Pages of English Translation & 3 Pages of Official copy).

Office Action received for Japanese Patent Application No. 2021-546291, mailed on Nov. 1, 2022, 09 Pages (5 pages of English translation & 4 pages of Official copy).

Invitation to Respond to Written Opinion received for Singapore Application No. 11202106921T, mailed on Nov. 7, 2022, 6 Pages.

* cited by examiner

HEAD SPACE FOR DEPTH FILTERS AND METHODS OF USING THE SAME

RELATED APPLICATIONS

The present application is a U.S. National Stage application of International Application No. PCT/US2020/025059, filed Mar. 26, 2020, which claims the benefit of U.S. Provisional Application No. 62/825,505, filed on Mar. 28, 2019, the entire contents of each of which is incorporated by reference herein in its entirety.

FIELD

Embodiments disclosed herein relate to depth filters and, particularly, depth filters having optimized head space, especially encapsulated or enclosed depth filters utilized in applications with high solids feeds, most commonly associated with clarification and post viral inactivation feeds containing precipitates. Embodiments also relate to methods of optimizing depth filters and methods of filtering samples having optimized depth filters.

BACKGROUND

Depth filters are ideal for a wide variety of primary and secondary clarification applications, including cell cultures, yeast and bacteria such as *E. coli* lysates post centrifuge, *E. coli* refolds, media, vaccines, plasma proteins, flocculates via low pH, salt flocculation, polymeric flocculates and sera. A depth filter utilizes its depth, or thickness, to carry out filtration. The filter media is typically a material structured with a gradient density, generally having more large pores near the top and smaller pores at the bottom. Depth filters, unlike absolute filters, retain particles throughout the porous media, allowing for retention of particles both larger and smaller than the pore size. Particle retention in depth filtration is accepted to use a variety of particle retention methods including size exclusion, hydrophobic adsorption, ionic adsorption and other interactions. This variety of retention methods allows for retention of particles both larger and smaller than the defined pore size.

In many cases, depth filters can be run in series such that most of the coarser particles are removed during the first filtration stage and finer particles are filtered out in a second stage. Thus, in a cell culture where there is a broad distribution of particle sizes such as from cells and cell debris, depth filters are intended to retain a majority of suspended particulates.

A depth filter three-dimensional matrix creates a maze-like path through which the sample passes. In various embodiments, the filter membranes or sheets may be wound cotton, polypropylene, rayon cellulose, fiberglass, sintered metal, porcelain, diatomaceous earth, or other known components such as silica, polyacrylic fibers (HC Pro media from EMD Millipore Corporation, Burlington, MA, USA). Compositions that comprise the depth filter media may be chemically treated to enable the filter media to capture charged particles, such as DNA, host cell proteins, or aggregates through ionic or electrostatic interactions.

In traditional depth filtration, the limiting factor which governs the loading capacity of depth filters is fouling of depth filter media, and hence the head space volume within the depth filtration device or the physical dirt holding capacity (also known as cake filtration) was not known to play a significant role. Fouling mechanisms of a depth filter may include pore blockage, cake formation and/or pore constriction. Recent improvements in cell culture have resulted in high biomass with increased cell viabilities. These feed streams may present reduced levels of the cellular debris or colloidal matter, which generally leads to fouling of depth filtration media.

Traditionally, encapsulated depth filters have been designed with minimum head space to reduce system hold-up volume and overall device dimensions to enable improved recovery and limit flush volumes (buffer and water). Thus, the focus in enhancing performance of depth filters has been on minimizing device dimensions to reduce hold-up volume and device footprint, which resulted in an indirect reduction of available head space. However, the present inventors have determined that reducing the head space can negatively impact the depth filter performance (loading capacity), especially when the filters are used for clarification of feeds with high solids.

Accordingly, an object of embodiments disclosed herein is to optimize the head space of depth filters to increase performance.

SUMMARY

Problems of the prior art have been addressed by embodiments disclosed herein, which relate to depth filters having an optimized head space, methods of optimizing the head space in depth filters, and methods of filtration using depth filters having an optimized head space.

The present inventors have unexpectedly discovered that head space volumes available within depth filters are critical variables for the design of enclosed or encapsulated depth filters used for removal of cells, cell debris, flocculated cell culture or precipitates, for example. Thus, the volume of head space or dirt holding capacity (cake filtration capacity) of the filter is a critical design variable for depth filter encapsulated devices. The impact of this variable is significant, particularly for feed streams having high solids (cells/biomass) concentration, and for low fouling feed streams where significantly large volumes of feed can be processed without fouling the filter media. Suitable applications where depth filter capacity may be governed by head space include the clarification of flocculated feed streams where pretreatment may include any of lowering cell culture pH, addition of polymers (uncharged or charged), or addition of salts to precipitate out solubilized impurities resulting in high insoluble biomass. The variable is also critical for scalability assessment.

In some embodiments, optimized head space is for primary clarification devices intended for cell culture clarification with harvests containing 25 to 100 million cells/mL which translates to approximately 3.5 to 11.5% biomass.

Accordingly, in some embodiments, a depth filter is provided, the depth filter comprising an encapsulating housing having an inlet, an outlet spaced from the inlet, and an internal volume containing filtration media, and a head space in the internal volume, wherein the volume of the head space is from 4 to 14 liters per square meter of filtration media area, preferably from 4 to 10 liters per square meter of filtration media area. In some embodiments, the filtration media comprises a composite of graded layers of non-woven fibers, cellulose, and diatomaceous earth, or polyacrylic fibers and silica (synthetic), or activated carbon, polypropylene, nylon, glass fibers, and combinations thereof. In some embodiments, the minimum depth filtration media area of the depth filtration device is >0.1 $m^2$. In some embodiments, the depth filtration media area is from 0.1 $m^2$ to 1.1 $m^2$.

In some embodiments, a process for the clarification of a feed containing a target biomolecule of interest and a plurality of cellular debris and/or colloidal particulates by depth filtration is provided. In some embodiments according to this disclosure, the process comprises providing a depth filtration device having a head space and porous depth filter media, wherein the volume of the head space is from 4 to 14 liters per meter squared of the depth filter media area in the device; providing a feed containing a target biomolecule of interest and a plurality of cellular debris and/or colloidal particulates; introducing the feed into the head space and contacting the depth filter media with the feed; and separating the target biomolecule of interest from cellular debris and colloidal particulates in the feed. In some embodiments, the process is carried out without the use of a primary clarification centrifugation step or a primary clarification tangential flow microfiltration step. In some embodiments, the target biomolecule of interest includes one or more of monoclonal antibodies (mAbs), enzymes, viruses, conjugated polysaccharides, biotherapeutics, polyclonal antibodies, and other bimolecular cellular materials expressed in mammalian cell cultures, plant cell cultures, bacteria cell cultures, insect cell cultures, and similar cultures of interest.

In some embodiments, a method of determining an optimal area of a depth filter needed to filter a volume of cell culture is provided, wherein the cell culture comprises a plurality of cells having a cell diameter (d), and having a total cell density, the method comprising:

1. Calculating the volume occupied by a single cell ($V_c$);
2. Multiplying $V_c$ by the total cell density to determine the volume of cells per volume of cell culture (L cells/L cell culture);
3. Determining the head space per unit area of a filter (L head space/m² of depth filter area).
4. Dividing the filter headspace per depth filter area by the volume of cells per volume of cell culture to determine a filter capacity (L cell culture/m² of depth filter area).

In some embodiments, the void volume occupied by the cells is taken into account in determining the volume occupied by the cells.

Optimized head space in depth filters in accordance with embodiments disclosed herein will help utilize the full capacity of the depth filter media, and compared to conventional designs, can result in as much as a 70% improvement for non-fouling media. Improved process economics result, as less area is needed, which translates to lower buffer requirements and increased product recovery.

These and other non-limiting aspects and/or features of the disclosure are more particularly described below. For a better understanding of the embodiments disclosed herein, reference is made to the accompanying drawings and description forming a part of this disclosure.

BRIEF DESCRIPTION OF THE DRAWINGS

The embodiments disclosed herein may take form in various components and arrangements of components, and in various process operations and arrangements of process operations. The drawings illustrate embodiments and are not to be construed as limiting. This disclosure includes the following drawings.

DETAILED DESCRIPTION

A more complete understanding of the components, processes and apparatuses disclosed herein can be obtained by reference to the accompanying drawings. The figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

For the purposes of this specification and appended claims, unless otherwise indicated, all numbers expressing quantities of ingredients, percentages or proportions of materials, reaction conditions, and other numerical values used in the specification and claims, are to be understood as being modified in all instances by the term "about" or "approximately" whether or not explicitly indicated. The term "about" or "approximately" generally refers to a range of numbers that one would consider equivalent to the recited value (i.e., having the same function or result). In many instances, these terms may include numbers that are rounded to the nearest significant figure.

Accordingly, unless indicated to the contrary, the numerical parameters set forth in the specification and claims are approximations that may vary depending upon the desired properties sought to be obtained by the embodiments disclosed herein. At the very least, and not as an attempt to limit the application of the doctrine of equivalents to the scope of the claims, each numerical parameter should at least be construed in light of the number of reported significant digits and by applying ordinary rounding techniques.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components.

All ranges disclosed herein are inclusive of the recited endpoint and independently combinable (for example, the range of "from 2 inches to 10 inches" is inclusive of the endpoints, 2 inches and 10 inches, and all the intermediate values).

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range of interpolated values "from 2 to 4."

It should be noted that many of the terms used herein are relative terms. For example, the terms "top" and "bottom" are relative to each other in location, i.e. an upper component is located at a higher elevation than a lower component and should not be construed as requiring a particular orientation or location of the structure. As a further example, the terms "interior", "exterior", "inward", and "outward" are relative to a center, and should not be construed as requiring a particular orientation or location of the structure.

The terms "top" and "bottom" are relative to an absolute reference, i.e., the surface of the earth. Put another way, a top location is always located at a higher elevation than a bottom location, toward the surface of the earth.

The terms "horizontal" and "vertical" are used to indicate direction relative to an absolute reference, i.e., ground level. However, these terms should not be construed to require structures to be absolutely parallel or absolutely perpendicular to each other.

The term gram may be abbreviated as gm, the term liter may be abbreviated L, the term milliliter may be abbreviated mL, the term cubic centimeters may be abbreviated $cm^2$, the term liter may be abbreviated L, the term liters per square meter may be abbreviated $L/m^2$, the term liters per square meter per hour may be abbreviated $L/m^2/H$ or LMH.

As used herein the term "depth filter" (e.g., gradient-density depth filter) achieves filtration within the depth of the filter material. A common class of such filters is those that comprise a random matrix of fibers bonded (or otherwise fixed), to form a complex, tortuous maze of flow channels. Particle separation in these filters generally results from entrapment by or adsorption to, the fiber matrix. The fiber-based filter materials may be in mat or pad form. The most frequently used depth filter media for bioprocessing of cell culture broths and other feedstocks consists of cellulose fibers, a filter aid such as diatomaceous earth (DE), and resin binder. Depth filter media, unlike absolute filters, retain particles throughout the porous media allowing for retention of particles both larger and smaller than the pore size. Particle retention is thought to involve both size exclusion and adsorption through hydrophobic, ionic and other interactions. The fouling mechanism may include pore blockage, cake formation and/or pore constriction. Depth filters are advantageous because they remove contaminants and also come in disposable (i.e., single use) formats thereby eliminating validation issues.

A primary clarification depth filter is able to remove whole cells and cell debris thus accomplishing the primary clarification of a feed containing a target biomolecule of interest and a plurality of cellular debris and colloidal particulates without the use of a primary clarification centrifugation step or a primary clarification tangential flow microfiltration step.

Suitable cellulosic depth filters, such as MILLISTAK®+ filters commercially available from EMD Millipore Corporation, are composite filters that include a layer of tightly structured cellulosic depth media, and can be optimized to a specific application, such as retaining colloidal particles and cell debris or retaining whole cells and larger debris. They combine two or more sequential grades of media in a single filter cartridge or housing. These filters are most commonly used in polishing or secondary clarification processes to remove small quantities of suspended matter from aqueous product (protein) streams. One function of these filters is to protect or extend the service life of more expensive downstream separation processes, such as sterile filtration and affinity chromatography, i.e., a common application for these filters is as "prefilters," protecting downstream process capacity (the volume of fluid that can pass through the filter before it plugs) from colloidal contaminants and other cell debris, which can greatly extend the life of the downstream process. In addition, such depth filters also are used for the protection of viral clearance filters by removing trace quantities of agglomerated proteins.

In traditional depth filtration applications, fouling of the depth filter media governed how much volume of the cell culture harvest could be processed/filtered by an "enclosed" or "encapsulated" depth filter of a given area. This volume is referred to as depth filter loading capacity, usually expressed as loading capacity of depth filter ($L/m^2$). Recent increases in cell densities have resulted in increased solid/cell mass/biomass loading in cell culture fluids. Additionally, optimization of depth filter media design, including but not limited to novel depth media composition as well as gradient layered depth filters, resulted in significantly higher volumes of cell culture fluids that can be processed using these depth filter media. These two factors independently or in conjunction with an enclosed or encapsulated depth filter design may result in the available upstream head space being fully occupied by cells/biomass, limiting overall capacity and underutilizing the depth filter media itself. Furthermore, difference in head space between different scale devices can introduce scalability challenges. Lack of head space also can result in media compression which can be detrimental to the performance of the depth filter.

Any depth filtration system available to one of skill in the art may be used in embodiments disclosed herein. In a particular embodiment, the depth filter can be in a scalable, disposable or single-use format, such as the MILLISTAK+® Pod Filter System available from EMD Millipore Corporation that is a modular design that is scalable from 5 to 12,000 liters or more. These depth filters incorporate multiple graded-density layers and adsorptive filter media. For example, MILLISTAK+® DE is composed of select grade cellulose fiber and diatomaceous earth; the MILLISTAK+® CE series is single layer media with cellulose fibers that are suitable for coarse filtration applications (e.g., 1 to 30 microns); and the MILLISTAK+® HC series is dedicated to improving productivity by combining two distinct technologies that enhance filter capacity and retention. The media of some embodiments according to the disclosure can be charged or uncharged. The CLARISOLVE® depth filter commercially available from EMD Millipore, and useful as a clarification tool with a gradient density structure specifically designed to the particle size distributions of pretreated feed streams, is also suitable.

Commercial depth filtration devices for clarification applications are available. As noted above, these include Millistak+® HC, Millistak+® HC Pro, and Clarisolve® depth filters from EMD Millipore Corporation. These depth filtration devices are available in multiple device sizes depending on the intended application and volume of process fluid to be filtered. For small volumes (<3 L), 23 cm² micropod devices are used. For intermediate volumes (3-10 L), laboratory scale devices are available in 135 cm², 270 cm², and 540 cm² device sizes. For pilot and production scale volumes (10-2000 L), process scale devices are available in 0.11 m², 0.33 m², 0.55 m², 0.77 m², and 1.1 m² device sizes.

In some embodiments, the depth filters may be used in methods for the clarification of feeds. In certain embodiments, clarification depth filtration of feeds, feed streams, feedstocks, cell culture broths and the like are provided, which utilizes a clarification depth filtration device having an optimized head space, optionally without the use of a primary clarification centrifugation step or primary clarification tangential flow microfiltration step. In some embodiments, primary clarification depth filtration of chemically treated feeds in which the cell mass has been flocculated into larger aggregates is provided. In certain embodiments, clarification of such feeds is carried out upstream of one or more chromatography operations.

In some embodiments, the depth filter media is contained within a housing (e.g., an encapsulating housing where the housing is part of the filter module) provided with a fluid inlet and a fluid outlet spaced from the fluid inlet. As used herein a filtration module is a self-contained assembly including depth media encapsulated in an enclosure, such as a plastic enclosure, with a flow path designed to perform filtration. The module can be used independently or with a holder. In some embodiments, the filter module is designed so that it can be directly attached to tubing or the like and used for lab scale filtration such as a pod. Larger modules can be assembled in a holder. The housing and any appropriate seals ensure that fluid to be filtered passes through the depth filter media prior to exiting the housing through the outlet. In some embodiments, an integral filtration device is formed, wherein all of the fluid to be filtered must pass through the depth filter media from the inlet to the outlet. The inlet can be positioned at the outer surface of the housing or within a centrally located portion of the housing while the outlet is positioned remote from the inlet to effect fluid passage as described above. In some embodiments, the housing may be a molded plastic pressure vessel. In some embodiments, the housing may be a cartridge as is known to those having skill in the art.

Figure 1A:
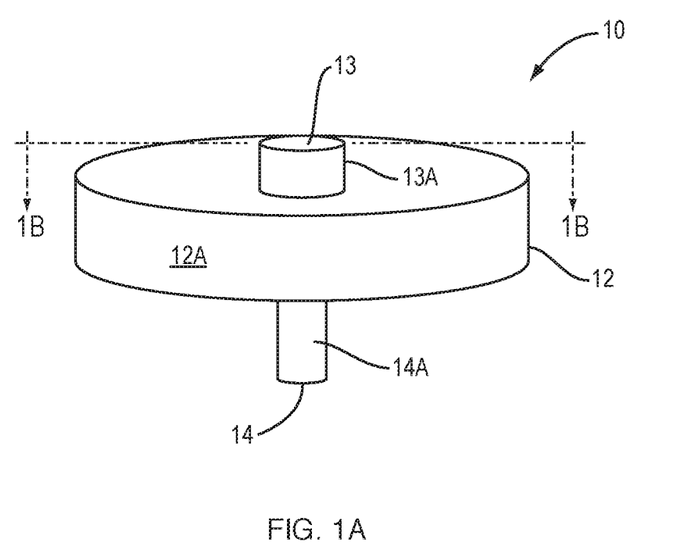
FIG. 1A is a perspective view of a depth filter in accordance with some embodiments.
Figure 1B:
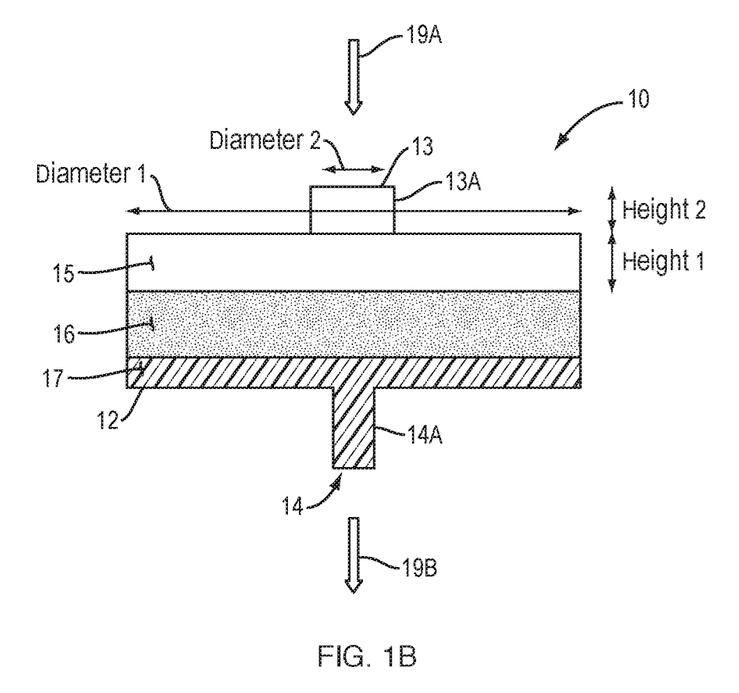
FIG. 1B is a cross-sectional view of the depth filter of FIG. 1A.

FIG. 1A is a perspective view of a depth filter 10 in accordance with some embodiments. Turning now to FIGS. 1A and 1B, there is shown a depth filter 10 in accordance with some embodiments. The depth filter 10 includes a suitable housing 12 having an inlet 13 and an outlet 14 spaced from the inlet 13. In some embodiments, the inlet 13 is formed by a cylindrical body 13A extending axially from the top surface of a disk-shaped main body member 12A and terminating in an opening at its free end. The outlet 14 is formed by a cylindrical body 14A extending axially from the bottom surface of a disk-shaped main body member 12A and terminating in an opening at its free end. The housing 12 may be formed of any suitable material not deleterious to the process, such as polyolefins, e.g., polyethylenes, polypropylenes, and blends comprising polyethylene and/or polypropylene. The housing 12 may be a cartridge. Those skilled in the art will appreciate that the shape or configuration of the housing 12 shown in FIGS. 1A and 1B is merely exemplary and that other shapes or configurations, including pods, are within the scope of the embodiments disclosed herein. The depth filter may be a single-use device.

FIG. 1B is a cross-sectional view of the depth filter 10 of FIG. 1A. FIG. 1B illustrates the internal volume of the housing 12, which includes, in the direction of flow during filtration (depicted by arrows 19A, 19B) from the inlet 13 to the outlet 14, a head space 15, the depth filter matrix 16, and the downstream hold-up volume 17, wherein the head space 15 is upstream of the depth filter matrix 16, and the downstream hold-up volume 17.

Figure 2:
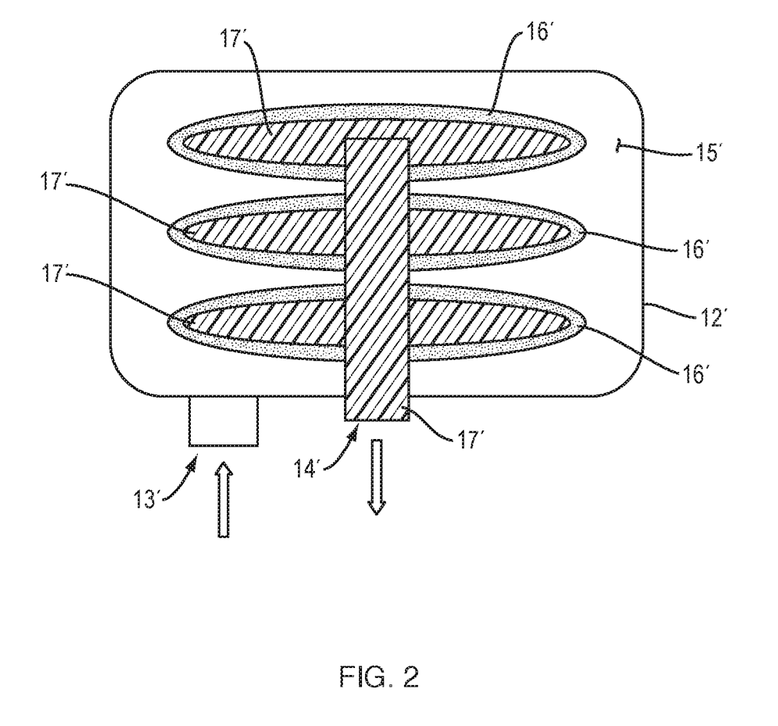
FIG. 2 is a front cross-sectional view of an alternative depth filter, e.g., a lenticular encapsulated depth filter in accordance with some embodiments according to the disclosure.

FIG. 2 is a front cross-sectional view of an alternative depth filter, e.g., a lenticular encapsulated depth filter in accordance with some embodiments according to the disclosure. FIG. 2 illustrates a depth filter that is an encapsulated lenticular design, wherein stacked disc filters are encapsulated in a housing 12'. The internal volume of the housing 12' includes head space 15', depth filter matrix 16', and hold-up volume 17'. Location of inlet 13' in the case of encapsulated devices may be a concentric annulus around the outlet 14', but other designs are possible and within the scope of the embodiments disclosed herein. In some embodiments, the feed enters the inlet 13', is filtered by the depth filter media 16', and then the filtered fluid flows to the hold-up volume region 17'. As can be seen, irrespective of the design/placement of the depth filter media 16, 16' and the hold up volume 17, 17', the feed first traverses the head space 15, 15'.

In some embodiments, head space can be measured based on physical dimensions of the filters or by using as experimental approach. The physical dimensions of the filter can be measured using instruments such as Vernier calipers, rulers etc. or in the case of more complex filter geometries such as an encapsulated lenticular depth filters and MILLISTAK® Pod filters, it can be derived from computer-aided design (CAD) drawings of the filter generated by software such as Solidworks (Dassault Systèmes), Pro/Engineering, Creo (PTC), etc.

For example, the calculation of head space for the depth filter shown in FIG. 1A is as follows:

Device head space volume =
$$\left(\frac{\pi*(\text{Diameter 1})^2}{4}*\text{Height 1}\right)+\left(\frac{\pi*(\text{Diameter 2})^2}{4}*\text{Height 2}\right)$$

Head space per unit area =
$$\frac{\left(\frac{\pi*(\text{Diameter 1})^2}{4}*\text{Height 1}\right)+\left(\frac{\pi*(\text{Diameter 2})^2}{4}*\text{Height 2}\right)}{\frac{(\pi*\text{Diameter 1})^2}{4}}$$

In some embodiments, an experimental approach for quantifying the head space may be performed using a slurry of known concentration of particulate. Particulates used for this work will have particle sizes such that they form a semi porous cake on the top surface of depth filters without fouling the depth media. Latex or polystyrene microspheres or bentonite of suitable particle size are examples of particulates that can be used. Suitable particle sizes may be in the range of 15-100 microns. The lower end of the range depends on the filter grade/porosity.

A suitable example of experimentally quantifying the head space is as follows. Two encapsulated depth filter devices of known area ("A" m² each) are pre-weighed with the weight being $W_1$ and $W_2$, respectively. The depth media should be comparable and have similar flow distribution in each device. An aqueous slurry containing appropriately sized particulates is filtered through both encapsulated depth filter devices until a terminal pressure of 25 (pounds per square inch) psi is reached. Particulate concentration should be low (below 5%) to ensure even distribution of solids and a filtration flux of approximately 150 liter/m²·hr should be maintained. The second device could be a scaled down version of the first device, facilitating the dissection for recovering the slurry from the head space.

In the first device, an air blowdown is performed to remove any water entrapped in the filter media and downstream holdup. The post air blowdown device is dried in a controlled temperature and humidity environment. When a stable weight is achieved, the final weight of the device is measured ($W_3$).

The second device is dissected and the slurry from the head space is recovered. The weight of wet slurry is measured ($W_4$), allowed to dry in a controlled temperature and humidity environment and its final weight is measured ($W_5$). The head space can be calculated using Equations 2 and 3:

Empty weight of device $1 = W_1$
Empty weight of device $2 = W_2$
Final weight of device 1 after air blowdown and drying $= W_3$
Wet weight of slurry $= W_4$
Dry weight of slurry $= W_5$
Weight of dried particulate matter from device $1 = W_3 - W_1$
Fraction water content of slurry $= ((W_4 - W_5)/W_5)$ (weight of water/weight of dry slurry)

$$\text{Total Device head space } H = (W_3 - W_1) \ast (1 + (W_4 - W_5)/W_5) \qquad \text{Equation 2}$$

$$\text{Head Space per unit area} = H/A = ((W_3 - W_1) \ast (1 + ((W_4 - W_5)/W_5))))/A \qquad \text{Equation 3}$$

Table 1 illustrates a numerical example of the experimental method to determine head space volume:

TABLE 1

| | | | | Comment |
|---|---|---|---|---|
| Area of device | A | 23 | cm² | |
| Empty weight of device 1 | W1 | 33 | gm | |
| Empty weight of device 2 | W2 | 33 | gm | |
| Weight of device 1 + dried slurry | W3 | 46.09 | gm | |
| Weight of dried slurry | W3 − W1 | 13.09 | gm | |
| Weight of wet slurry | W4 | 18 | gm | From Filter 2 |
| Weight of dried slurry | W5 | 13.09 | gm | From Filter 2 |
| Fraction of water per dried slurry | (W4 − W5) / W5 | 0.375 | gm water/gm dried slurry | |
| Device headspace | H = (W3 − W1) * (1 + ((W4 − W5) / W5)) | 18 | gm | |
| Headspace per unit area | H/A | 7.8 | L/m² | *Assuming Density = 1000 gm/L |

Clarification applications generally contain high cell mass or biomass content or feed streams which cause limited or no fouling of the depth filter media. In these cases, during filtration there is a possibility of eventually running out of head space. Consequently, head space is the limiting factor for the volume of feed which can be processed, rather than the typical media fouling. Accordingly, by optimizing the head space in accordance with embodiments disclosed herein, devices can be designed which do not exhibit capacity limitations due to head space, and which result in full utilization of depth media. This also is useful while designing scale down devices, as inconsistent head space-to-area ratios can result in failure for the device to be scalable.

In some embodiments, the optimal head space for primary clarification devices may be defined using the following procedure:

Quantify cell mass content in feed stream as a function of cell density

Cells are assumed to be rigid spheres with average diameters of 13 microns. The volume of each cell is:

$$\text{Volume of Cell} = V$$

$$= \frac{4\pi \left(\frac{D}{2}\right)^3}{3}$$

$$= 1.15 \ast 10^{-15} \text{ m}^3/\text{cell}$$

$$= 1.15 \ast 10^{-9} \text{ ml/cell}$$

This volume is multiplied by the total harvest cell density (TCD), which is usually expressed as cells/ml:

Total Cell Density $= TCD = 12 \ast 10^6$ cell/ml of cell culture, for example.

This provides a correlation between total cell density and volume of cell mass per unit volume of feed. Different cell lines can have different diameters. Thus:

$$\text{Volume of the cells } V_{cells} =$$

$$V \ast TCD = 1.15 \ast 10^{-9} \text{ ml/cell} \ast 12 \ast 10^6 \text{ cells/ml of cell culture} =$$

$$0.0138 \text{ ml of cells/ml of cell culture}$$

So the % biomass was calculated as $V_{cells} \ast 100 =$ $$1.38\% \text{ volume cell/volume cell culture}$$

Figure 3:
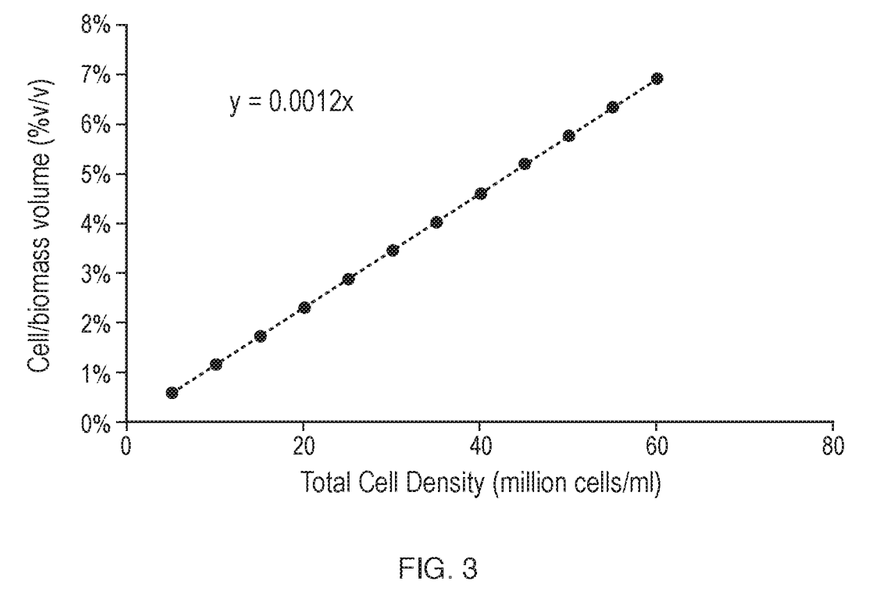
FIG. 3 is a graph correlating the total cell density to percent biomass/cell mass volume in a feed stream in accordance with some embodiments.

Additionally, where the spherical assumption for the cell mass is not applicable, or where a significantly wide particle distribution may exist with varying sphericity, biomass/cell mass can be experimentally quantified by centrifuging a known volume of feed material and calculating the volume of settled biomass (separated as a pellet at the bottom) to the total volume of feed (such as, for example, precipitates, flocculates, etc.). FIG. 3 plots the correlation of total cell density to percent biomass/cell mass volume in a feed stream.

It is assumed that the entire cell mass is being retained in the head space of the filter device (at times when the top layer/layers of the filter media have very high voidage and have open structure to accommodate biomass, the void volume of the top layer or layers also can be quantified under available head space). When particles of defined geometry are randomly packed in a confined space, there is a void volume associated with that packing. A void volume fraction of 0.375 was assumed for poured random packing with spherical geometries. Suitable void volume fractions $\phi$ for this assumption include 0.5-0.38. Accordingly, the volume occupied by cells is:

$$V_{cells} * (1 + \phi) = 0.0138 * (1 + 0.375)$$

$$= 0.0189 \text{ ml/ml of cell culture}$$

The head space volume in a depth filter is X and is expressed in units of L head space/m² depth filter area.

In this example we assuming a head space volume (X) of 2 L head space/m² of depth filter area.

The volume of cell culture that can be processed through a filter, filter capacity, is expressed in units of L of cell culture/m² depth filter area.

This value may be calculated as follows: (Filter capacity)= $X/V_{cells} * (1+\phi) = 2/0.0189 = 105.8$ L cell culture/m² of depth filter area.

Similarly, if the volume of head space is 4 L head space/m² of depth filter area, the volume of cell culture that can be processed $= X/V_{cells} * (1+\phi) = 4/0.0189 = 211.8$ L cell culture/m² of depth filter area.

Similarly, if the volume/of head space is 12 L head space/m² of depth filter area, the volume of cell culture that can be processed $= X/V_{cells} * (1+\phi) = 12/0.0189 = 634.9$ L cell culture/m² of depth filter area.

Next, the area required to filter a 2000 L batch is identified:

$$A = V_{batch} / * (XN_{cells}) = 2000/105.8 = 18.9 \text{ m}^2 \text{ (head space 2 L/m}^2\text{)}$$

$$= 2000/211.8 = 9.44 \text{ m}^2 \text{ (head space 4 L/m}^2\text{)}$$

$$= 2000/634 = 3.15 \text{ m}^2 \text{ (head space 12 L/m}^2\text{)}$$

Accordingly, the percent depth filter area reduction with increase in Head space is:

$(A_{2l/m2} - A_{2l/m2}) * 100 / A_{2l/m2} = (18.9 - 18.9) * 100 / 18.9 = 0\%$ $(A_{2l/m2} - A_{4l/m2}) * 100 / A_{2l/m2} = (18.9 - 9.44) * 100 / 18.9 = 50\%$ $(A_{2l/m2} - A_{12l/m2}) * 100 / A_{2l/m2} = (18.9 - 3.15) * 100 / 18.9 = 83\%$

Figure 4:
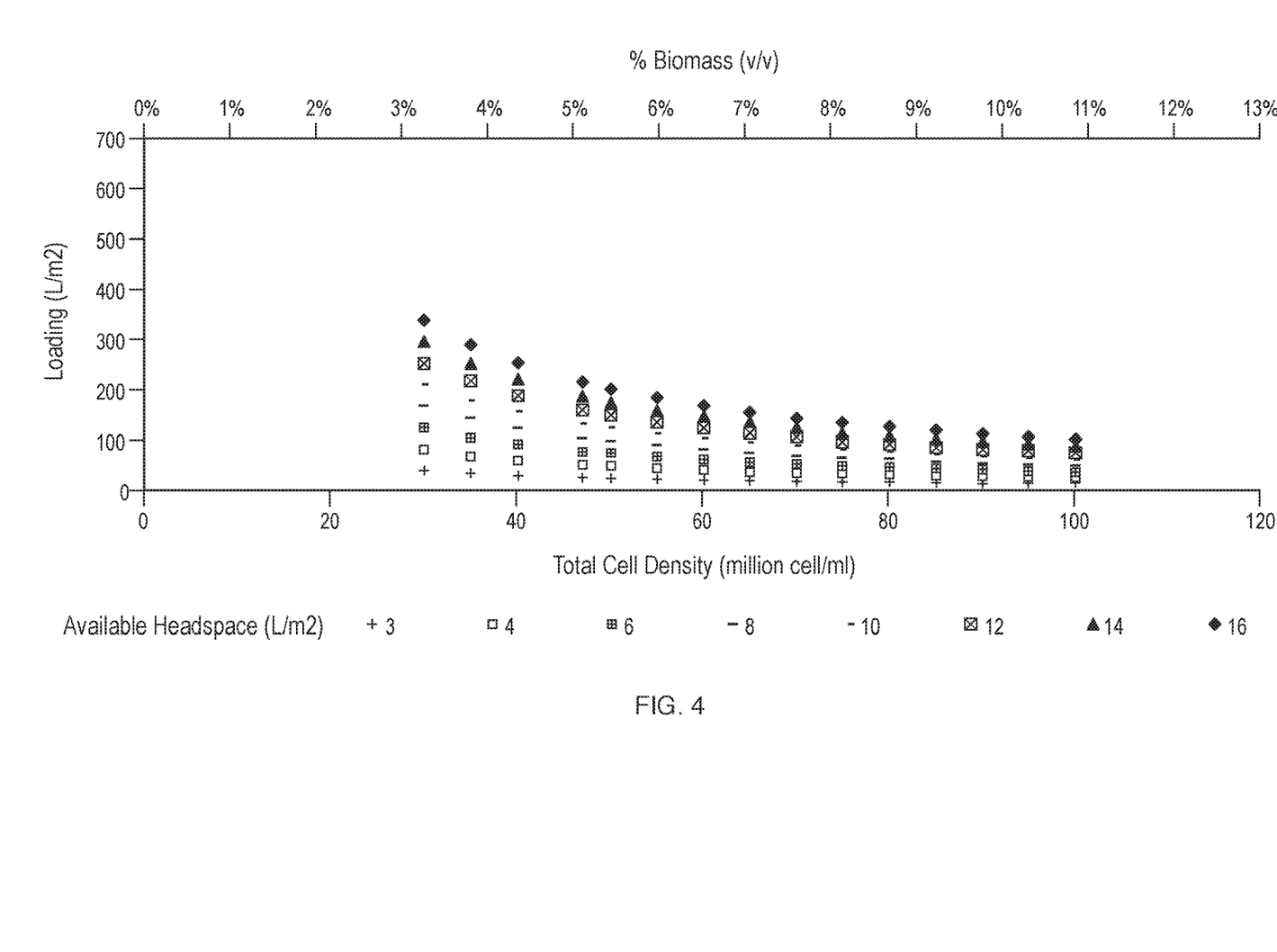
FIG. 4 is a graph showing the maximum feed loading capacity as a function of depth filter head space and total cell density (% biomass) in the feed.
Figure 5:
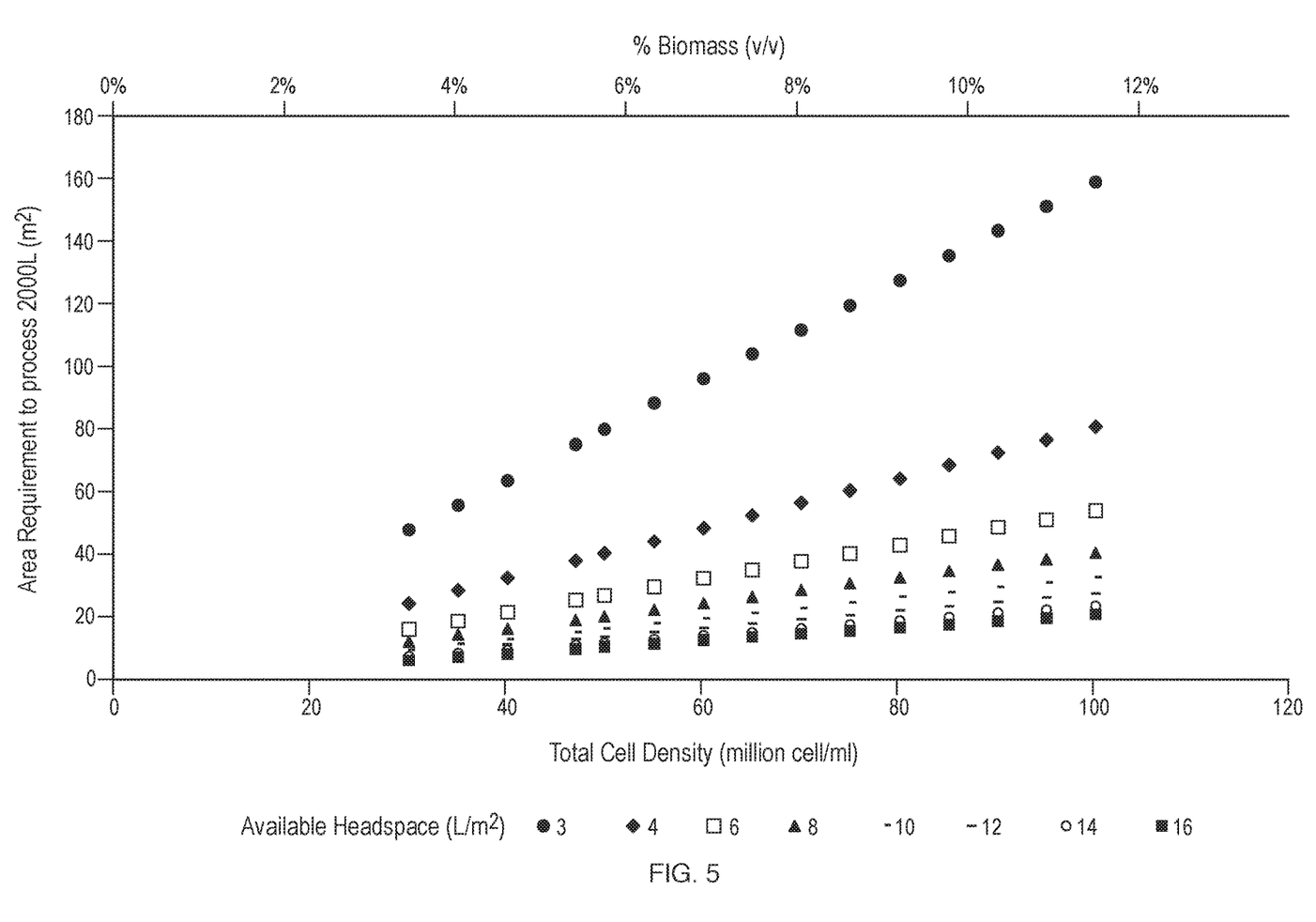
FIG. 5 is a graph showing the depth media area required to process 2000 L harvest as a function of head space and total cell density, in accordance with some embodiments.

The maximum feed loading capacity was plotted as a function of head space and total cell density (or biomass) and is shown in FIG. 4. The maximum loading capacities shown assume that the filter media exhibits limited or no fouling and the capacity is governed by available head space. These loading capacities were used to calculate respective area required to process 2000 L. The batch volume is arbitrarily selected. The results are obtained by dividing the batch volume by respective loading capacity and are plotted in FIG. 5.

Figure 6:
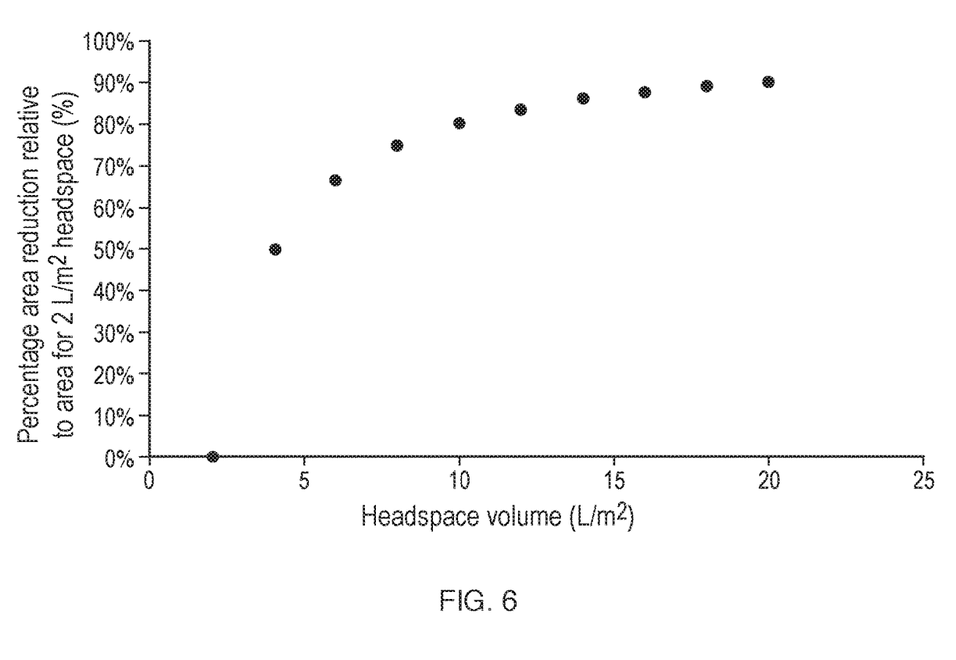
FIG. 6 is a graph showing the percentage depth media area reduction which can be achieved by increasing head space volume relative to depth media area required with 2 L/m² head space, in accordance with some embodiments.
Figure 7A:
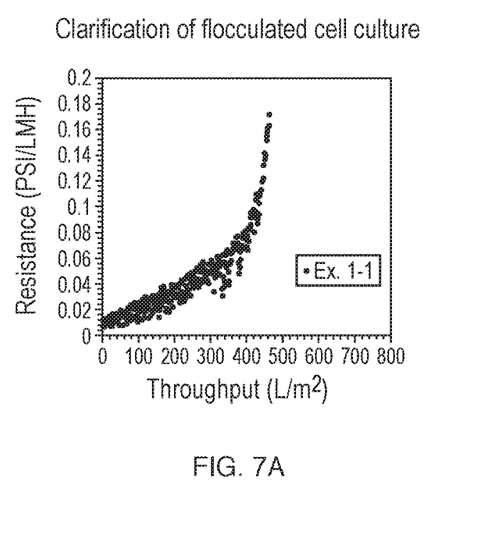
FIGS. 7A-7F are pressure profile curves for various depth filtration devices in accordance with Example 1.
Figure 7B:
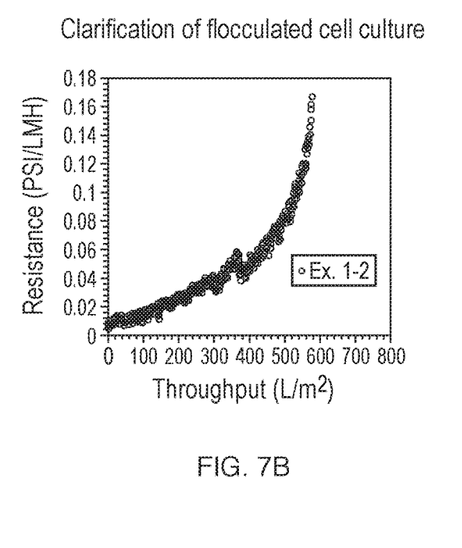
Figure 7C:
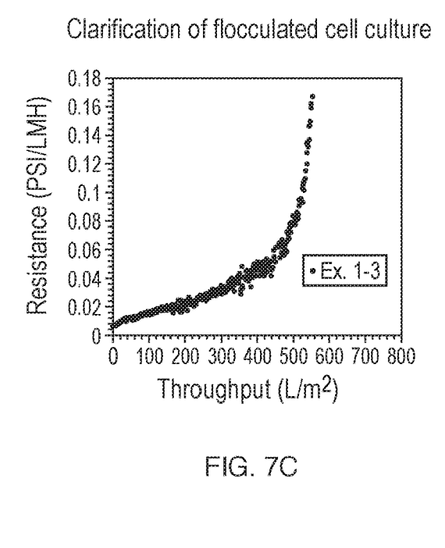
Figure 7D:
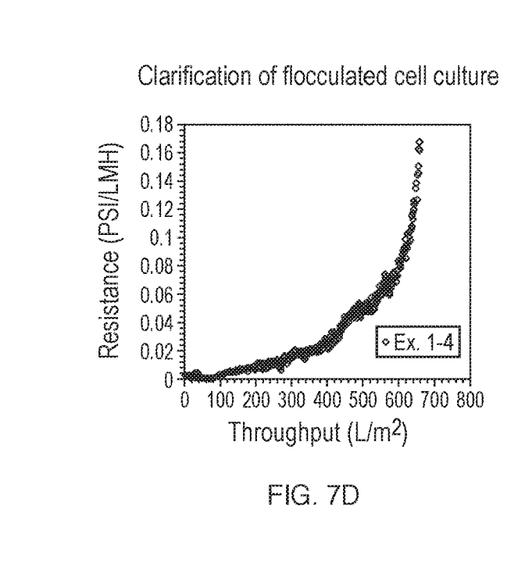
Figure 7E:
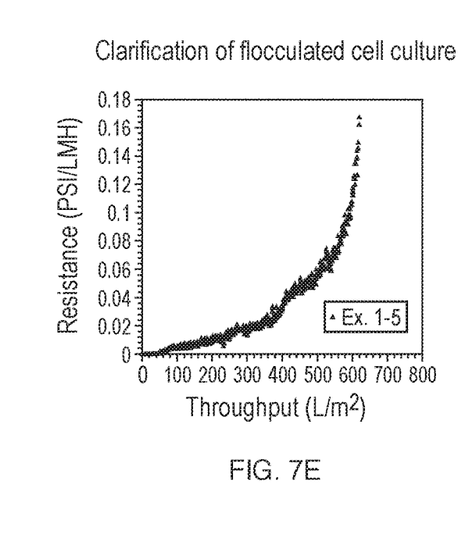
Figure 7F:
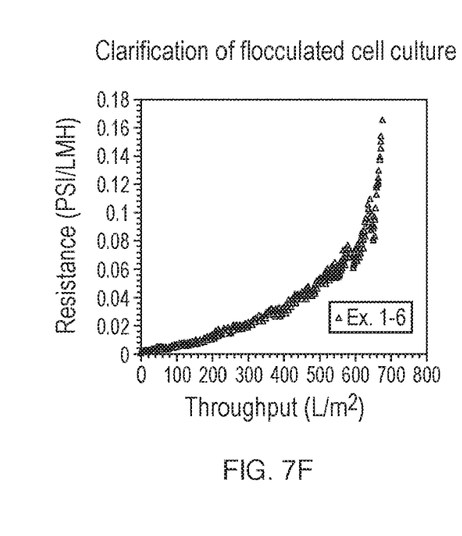

Depth filter media area reduction for processing a 2000 L batch, which can be achieved by increasing the head space relative to the head space of 2 L/m², was calculated. As the percentage is independent of total cell density, only one curve is shown. This percentage area reduction is shown in FIG. 6.

The results demonstrate that an optimum head space volume is from about 4 liters of head space per meter squared of depth filter area (4 L/m²) to about 14 liters of head space per meter squared of depth filter area (14 L/m²), preferably from about 4 L/m² to about 10 L/m². Other optimal head space volumes include the following ranges (all in L/m²); 4-13, 4-12 4-11, 4-10, 4-9, 4-8, 4-7, 4-6, 4-5; 5-14, 5-13, 5-12, 5-11, 5-10, 5-9, 5-8, 5-7, 5-6; 6-14, 6-13, 6-12, 6-11, 6-10, 6-9, 6-8, 6-7; 7-14, 7-13, 7-12, 7-11, 7-10, 7-9, 7-8; 8-14, 8-13, 8-12, 8-11, 8-10, 8-9; 9-14, 9-13, 9-12, 9-11, 9-10; 10-14, 10-13, 10-12, 10-11; 11-14, 11-13, 11-12; 12-14, 12-13; and 13-14 L/m². Too high ratio of head space volume to depth filter area causes flow distribution challenges, excessive weight of the device, etc.

Example 1

Clarification of flocculated cell culture. A CHO-S cell culture harvest was flocculated by addition of a water-soluble polymer. At least one suitable water-soluble polymer is poly (dimethyldiallyl ammonium chloride) (pDADMAC) polymer flocculant. The flocculated cell culture was filtered using the six depth filtration devices described in Table 2. In these experiments, 23 cm² depth filtration devices were constructed by assembling a top part containing an upper flow distributor and inlet hose barb, the filter media layers, and a bottom part containing a lower flow distributor and outlet hose barb. The device head space was varied by the installation of plastic spacer rings between the top part of the filter device and the bottom part of the filter device. An over-molded jacket of thermoplastic was utilized to hold the components together and to provide a water-tight seal. The device internal volume was determined as follows. The assembled, dry devices were weighed, completely filled with water, and weighed again. The depth filter media volume was determined as the product of the total thickness of the media layers (1.6-2.0 cm) and the filter frontal area (23 cm²). The device headspace is calculated as one half of the difference between the device internal volume and the depth filter media volume. The device headspace is defined as device internal volume located above the bed of depth filtration media within a depth filtration device. The device tailspace is defined as device internal volume located below the bed of depth filtration media within a depth filtration device.

The flocculated CHO-S cell culture harvest was processed through each of the depth filtration devices at a flow rate of 150 LMH until a terminal pressure of 20 psi was obtained. FIGS. 7A-7F are pressure profile curves for various depth filtration devices in accordance with Example 1.

A filter capacity of 462 L/m² was obtained in example 1-1. This device presents no available headspace and a slight compression of the filter media is calculated. The device of example 1-2 utilized spacer rings to locate the device internal volume below the bed of depth filter media (tailspace). The filter capacity was 574 L/m². In contrast, the device of example 1-4 utilized the same number of spacer rings to locate the device internal volume above the bed of depth filter media. An increased depth filtration capacity of 675 L/m² was observed for this device. Examples 1-3, 1-4, 1-5, and 1-6 represent a progression of increased device headspace and the corresponding impact on the device filtration capacity. FIGS. 7A-7F show plots of the device resistance versus filter throughput for the filter devices of examples 1-1 thru 1-6, as shown in Table 2. The process flux was 150 LMH. These plots show that the filter devices of examples 1-2 and 1-3 provide a slightly higher filter capacity for the flocculated feedstream than that of example 1-1. The filter devices of examples 1-4, 1-5, and 1-6 provide further increases in filter capacity for the flocculated feedstream than that of example 1-1.

TABLE 2

Depth filtration device configurations.

| Device ID | Description | Filter frontal area (cm²) | Device internal volume, actual (mL) | Total media thickness (cm) | Total media volume (mL) | Device headspace = internal vol − media vol)/2 (mL) | Ratio of device headspace/filter frontal area (L/m²) | Filter capacity at resistance = 0.16 (L/m²) |
|---|---|---|---|---|---|---|---|---|
| Ex. 1-1 | no headspace, no tailspace | 23 | 31.9 | 1.6 (w/ 20% compression) | 36.8 | −2.5 (media compression) | −1.1 | 462 |
| Ex. 1-2 | tailspace only (3 spacers) | 23 | 46.3 | 2.0 | 46.0 | N/A | N/A | 574 |
| Ex. 1-3 | headspace only (2 spacers) | 23 | 41.4 | 2.0 | 46.0 | −2.3 (media compression) | −1.0 | 550 |
| Ex. 1-4 | increased headspace (3 spacers) | 23 | 46.3 | 2.0 | 46.0 | 0.2 | 0.1 | 657 |
| Ex. 1-5 | increased headspace (4 spacers) | 23 | 50.2 | 2.0 | 46.0 | 2.1 | 0.9 | 620 |
| Ex. 1-6 | increased headspace (6 spacers) | 23 | 59.0 | 2.0 | 46.0 | 6.5 | 2.8 | 677 |

Example 2

Clarification of flocculated cell culture. A CHO-S cell culture harvest was flocculated by addition of a water-soluble polymer. At least one suitable water-soluble polymer is poly (dimethyldiallyl ammonium chloride) (pDADMAC) polymer flocculant. The flocculated cell culture was filtered using the three depth filtration devices described in Table 3. In these experiments, 23 cm² depth filtration devices were constructed by assembling a top part containing an upper flow distributor and inlet hose barb, the filter media layers, and a bottom part containing a lower flow distributor and outlet hose barb. The device head space was varied by the installation of plastic spacer rings between the top part of the filter device and the bottom part of the filter device. An over-molded jacket of thermoplastic was utilized to hold the components together and to provide a water-tight seal. The device internal volume was determined as follows. The assembled, dry devices were weighed, completely filled with water, and weighed again. The depth filter media volume was determined as the product of the total thickness of the media layers (1.9-2.0 cm) and the filter frontal area (23 cm²). The device headspace is calculated as one half of the difference between the device internal volume and the depth filter media volume.

Figure 8A:
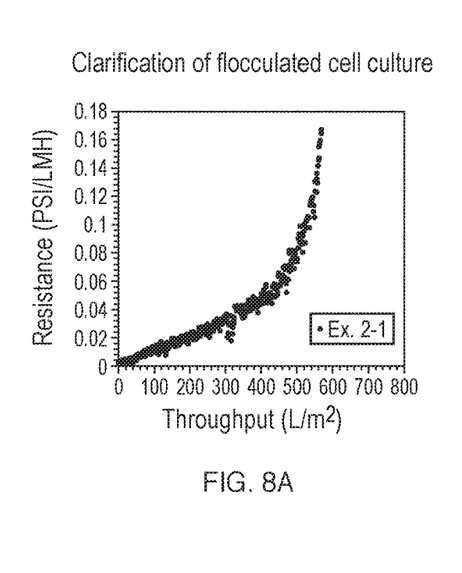
FIGS. 8A-8C are pressure profile curves for various depth filtration devices in accordance with Example 2.
Figure 8B:
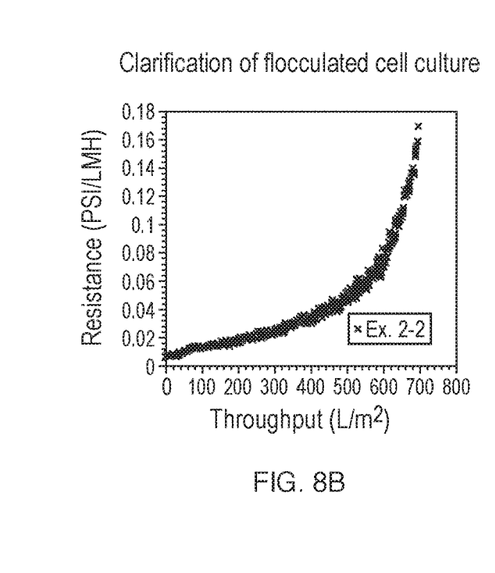
Figure 8C:
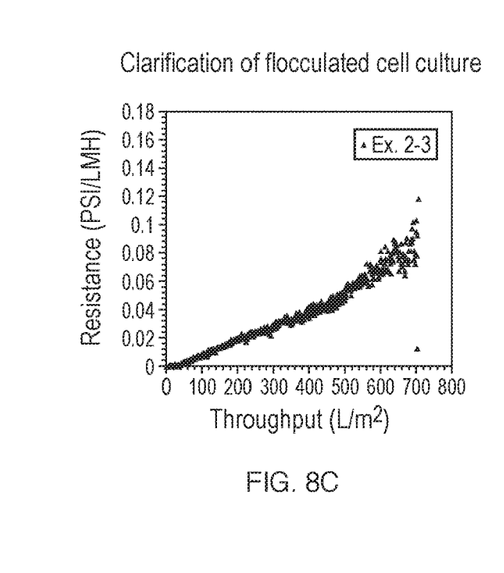

The flocculated CHO-S cell culture harvest was processed through each of the depth filtration devices at a flow rate of 150 LMH until a terminal pressure of 20 psi was obtained. FIGS. 8A-8C are pressure profile curves for various depth filtration devices in accordance with Example 2.

A filter capacity of 544 L/m² was obtained in example 2-1. This device presents no available headspace and a slight compression of the filter media is calculated. An increase in depth filtration capacity was observed for examples 2-2 and 2-3. These two devices present an increased headspace and there is minimal compression of the filter media. FIGS. 8A-8C shows plots of the device resistance versus filter throughput for the filter devices of examples 2-1, 2-2, and 2-3, as shown in Table 3. The process flux was 150 LMH. These plots show that the filter devices of examples 2-2 and 2-3 provide a higher filter capacity for the flocculated feedstream than that of example 2-1.

TABLE 3

Depth filtration device configurations.

| Device ID | Description | Filter frontal area (cm²) | Device internal volume, actual (mL) | Total media thickness (cm) | Total media volume (mL) | Device headspace = internal vol − media vol)/2 (mL) | Ratio of Device headspace/filter frontal area (L/m²) | Filter capacity at resistance = 0.12 (L/m²) |
|---|---|---|---|---|---|---|---|---|
| Ex. 2-1 | no headspace | 23 | 39.2 | 1.9 (w/ 5% compression) | 43.7 | −2.2 (media compression) | −1.0 | 544 |
| Ex. 2-2 | increased headspace | 23 | 58.4 | 2.0 | 46.0 | 6.2 | 2.7 | 662 |
| Ex. 2-3 | increased headspace | 23 | 66 | 2.0 | 46.0 | 10 | 4.3 | 704 |

We claim:

1. A depth filter comprising a housing having an inlet, an outlet spaced from said inlet, an internal volume containing filtration media, and a head space in said internal volume, wherein a volume of said head space is from 4 to 14 liters per square meter of filtration media area in said internal volume.

2. The depth filter of claim 1, wherein the volume of said head space is from 4 to 10 liters per square meter of filtration media area in said internal volume.

3. The depth filter of claim 1, wherein said filtration media comprises a composite of graded layers of non-woven fibers, cellulose, and diatomaceous earth.

4. The depth filter of claim 1, wherein the filtration media area has a minimum value of 0.1 m².

5. A filter assembly for filtering particles from a liquid which comprises:
- a housing having an inlet for introduction of a liquid to be filtered and an outlet for filtered liquid, said outlet being spaced from said inlet;
- a depth filter media in said housing; and
- a head space in said housing and upstream of said depth filter media in a direction of fluid flow during filtration, wherein a volume of said head space is from 4 to 14 liters per meter squared of depth filter media area in said housing.

6. The filter assembly of claim 5, wherein the volume of said head space is from 4 to 10 liters per square meter of the depth filter media area in said housing.

7. The filter assembly of claim 5, wherein said depth filter media comprises a composite of graded layers of non-woven fibers, cellulose, and diatomaceous earth.

8. A process of removing impurities from a biological sample, comprising filtering said biological sample through a depth filter comprising a housing having a volume, media in said volume, and a head space in said volume, wherein the volume of said head space is from 4 to 14 liters per square meter of filtration media area.

9. A process for clarification of a feed containing a target biomolecule of interest and a plurality of cellular debris and/or colloidal particulates by depth filtration, the process comprising:
- a) providing a depth filtration device having a head space and porous depth filter media, wherein a volume of said head space is from 4 to 14 liters per meter squared of depth filter media area in said device;
- b) providing the feed containing the target biomolecule of interest and the plurality of cellular debris and/or colloidal particulates;
- c) introducing the feed into said head space and contacting the depth filter media with the feed; and
- d) separating the target biomolecule of interest from the cellular debris and the colloidal particulates in the feed.

10. The process of claim 9, wherein said depth filtration is carried out without use of a primary clarification centrifugation step or a primary clarification tangential flow microfiltration step.

11. The process of claim 9, wherein the volume of said head space is from 4 to 10 liters per meter squared of said depth filter media area in said device.

12. A process of optimizing a performance of a depth filter, the depth filter having a housing having a fluid inlet, a fluid outlet spaced from said fluid inlet, an internal volume, porous depth filter media in said internal volume, and a head space between said fluid inlet and said porous depth filter media, said process comprising configuring a volume of said head space to be from 4 to 14 liters per meter squared of said porous depth filter media in said housing.

13. A method of determining an area of a depth filter needed to filter a volume of cell culture comprising a plurality of cells having a cell diameter, and having a total cell density, said method comprising:
- calculating a volume occupied by a single cell ($V_c$);
- multiplying $V_c$ by the total cell density to determine a volume of cells per volume of cell culture (L cells/L cell culture);
- determining a head space per unit area of a filter (L head space/$m^2$ of depth filter area) to define a filter head space per depth filter area;
- dividing the filter head space per depth filter area by the volume of cells per volume of cell culture to determine a filter capacity (L cell culture/$m^2$ of depth filter area); and
- dividing said volume of cell culture by said filter capacity to determine an area of the filter sufficient to filter said volume of cell culture.

14. The method of claim 13, wherein the volume occupied by the cells comprises the volume of a cell multiplied by the total cell density.

15. The method of claim 14, wherein the volume occupied by the cells further comprises a void volume between cells.

16. The method of claim 15, wherein the void volume is between about 0.5-0.38.

17. A method of determining an optimum volume of cell culture to be filtered by a depth filter having a defined head space volume, wherein the volume of cell culture comprises a plurality of cells having a cell diameter, and having a total cell density, said method comprising:
- calculating a volume occupied by a cell;
- multiplying the volume occupied by the cell with the total cell density of cell culture media; and
- dividing a head space per unit depth filtration area by the multiplication of the volume occupied by the cell with the total cell density of cell culture media to obtain the optimum volume than can be processed by the unit depth filtration area with defined head space volume per unit depth filtration area, wherein said head space volume is from 4 to 14 liters per meter squared of said depth filtration area.

18. The method of claim 17, wherein the volume occupied by the cells comprises the volume of a cell multiplied by the total cell density.

19. The method of claim 18, wherein the volume occupied by the cells further comprises a void volume between cells.

20. The method of claim 19, wherein the void volume is between approximately 0.5-0.38.

* * * * *